May 1, 1956 — H. A. BRUNTJEN — 2,743,663
APPARATUS FOR POPPING CORN
Filed Feb. 16, 1951 — 5 Sheets-Sheet 1

Inventor
Herman A. Bruntjen
By his Attorneys
Merchant & Merchant

May 1, 1956 H. A. BRUNTJEN 2,743,663
APPARATUS FOR POPPING CORN
Filed Feb. 16, 1951 5 Sheets-Sheet 2
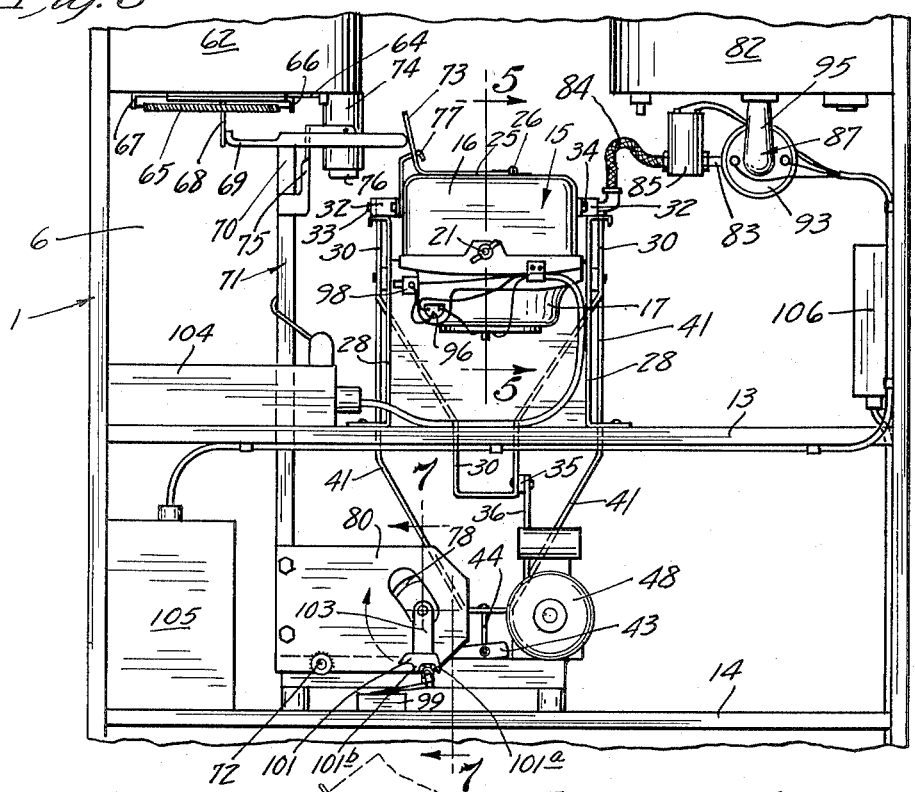
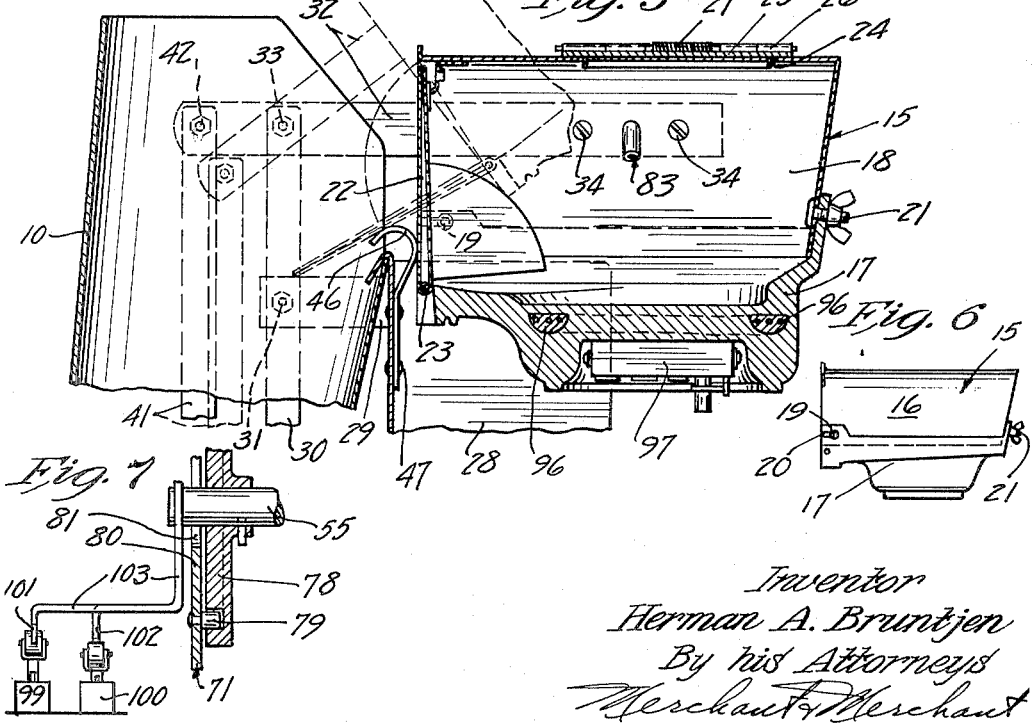
Inventor
Herman A. Bruntjen
By his Attorneys
Merchant & Merchant May 1, 1956 H. A. BRUNTJEN 2,743,663
APPARATUS FOR POPPING CORN
Filed Feb. 16, 1951 5 Sheets-Sheet 3
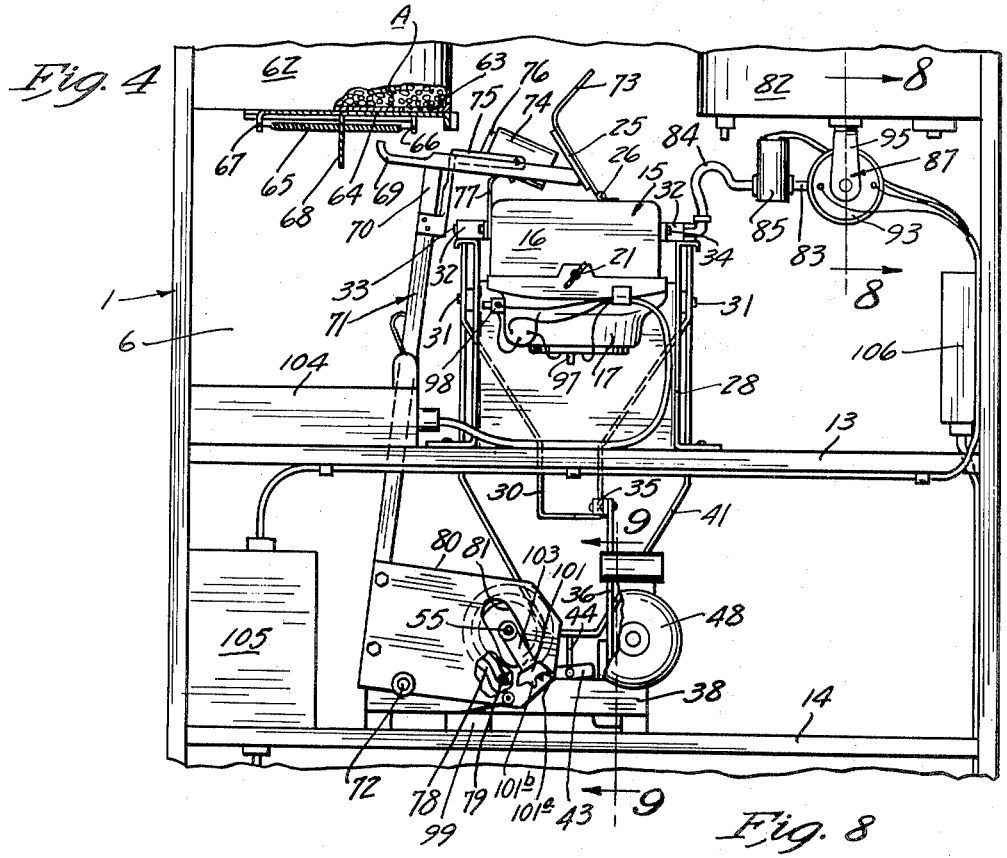
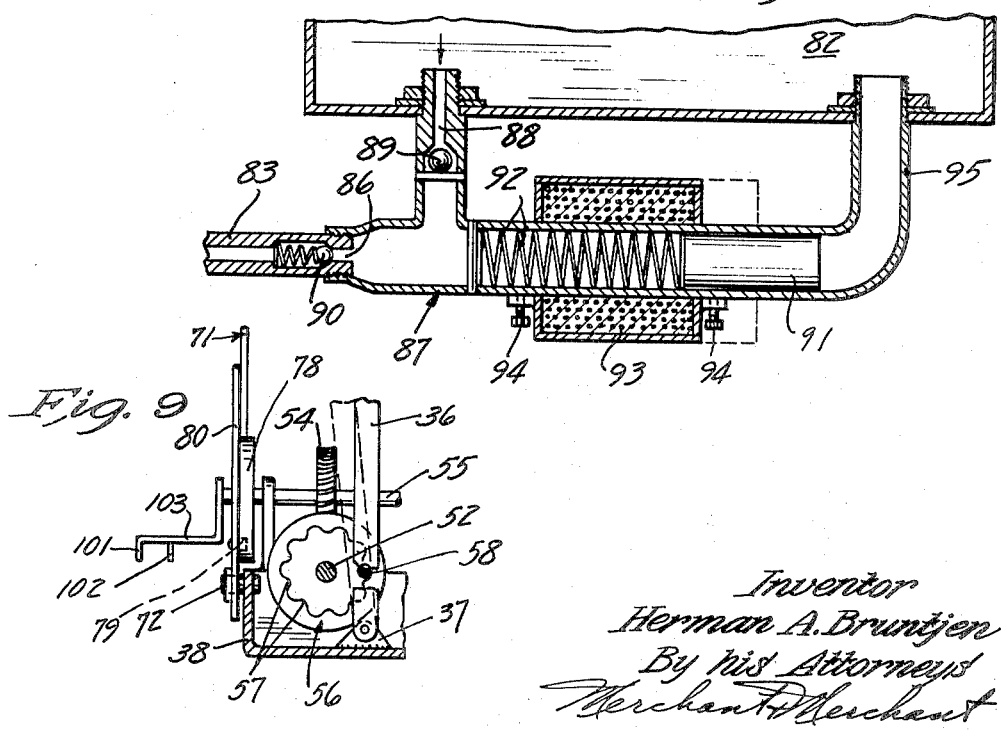
Inventor
Herman A. Bruntjen
By his Attorneys
Merchant & Merchant May 1, 1956  H. A. BRUNTJEN  2,743,663
APPARATUS FOR POPPING CORN
Filed Feb. 16, 1951  5 Sheets-Sheet 4
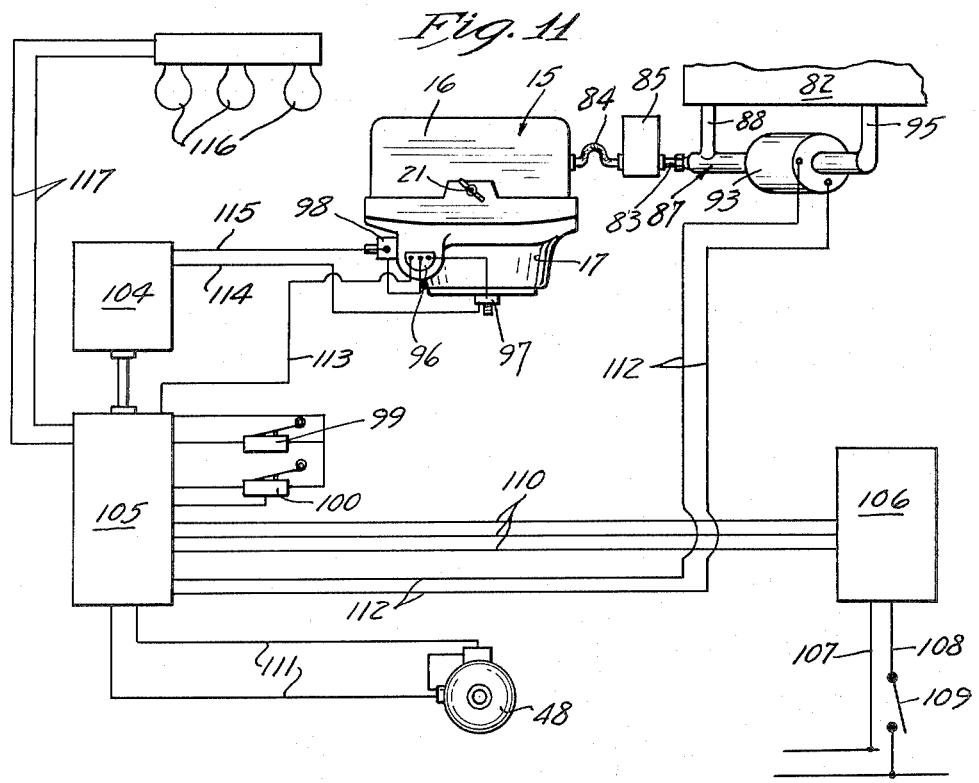
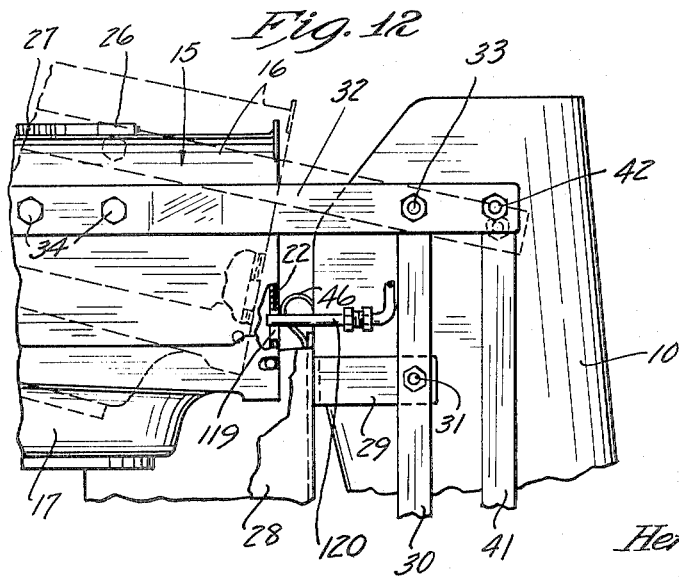
Inventor
Herman A. Bruntjen
By his Attorneys
Merchant & Merchant

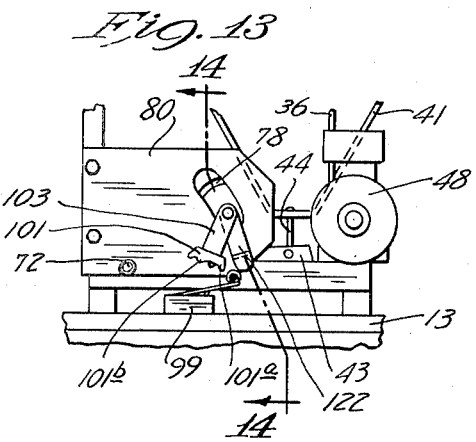
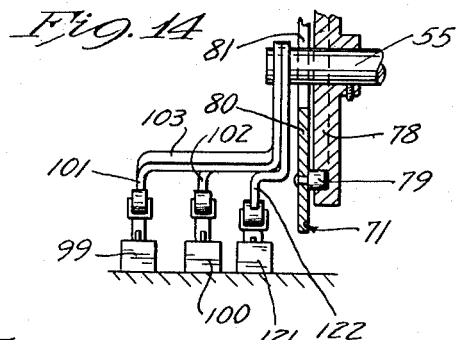
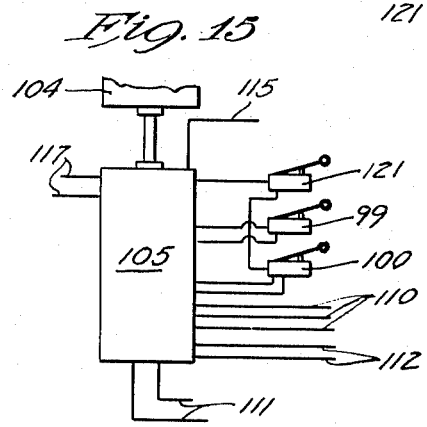

United States Patent Office 2,743,663
Patented May 1, 1956

2,743,663

APPARATUS FOR POPPING CORN

Herman A. Bruntjen, Minneapolis, Minn., assignor to Edwin A. Polzin, Minneapolis, Minn.

Application February 16, 1951, Serial No. 211,311

11 Claims. (Cl. 99—238.1)

My invention relates to improvements in corn popping machines and more particularly to improvements in machines of the type which utilize heated oil or grease in the popping of corn.

The use of hot oil or grease in the so-called French frying method of popping corn, wherein a series of consecutive quantities of corn are popped by submerging the same into a common container of hot oil or the like, produces very satisfactory and uniform results at the outset. However, the temperature required to pop corn is sufficiently high when maintained over a period of time to cause the oil to oxidize or break down, leaving a varnish-like residue on the interior of the popping receptacle. Furthermore, vaporized oil escaping from the receptacle condenses on portions of the popping mechanism exterior of the popping receptacle and causes an accumulation of said varnish-like residue thereon. This condition not only results in an unsightly appearance of the working parts of the popping machine, but also greatly impairs the efficiency of operation thereof.

The primary object of my invention is the provision of a corn popping machine of the type utilizing hot oil or grease, which will effectively pop the corn, but which will not accumulate the above varnish-like residue. To this end, I provide means for rapidly cooling the popping receptacle between separate popping operations to a temperature below the oxidization point of the popping oil or grease, so that evaporation of the oil is prevented, or at least maintained at a satisfactory minimum.

Another object of my invention is the provision of a novel arrangement whereby a desired popping temperature is maintained in the popping receptacle during the popping operation and a definite predetermined lower temperature is maintained in the receptacle during idle periods of the machine.

Another object of my invention is the provision of novel popping receptacle structure which permits quick and easy dismantling thereof for cleaning or servicing, if necessary.

A still further object of my invention is the provision of a corn popping machine, as set forth, which is relatively simple and inexpensive to manufacture, which is efficient in operation, and which is rugged in construction and extremely durable in use.

Another object of my invention is the provision of a novel method of popping consecutive batches of pop corn in a receptacle, whereby the cooking oil used in the popping operation will be prevented from oxidizing and discoloring said receptacle.

Other highly important objects and advantages of my invention will become apparent from the following detailed description, appended claims and attached drawings.

Referring to the drawings which illustrate the invention, and in which like characters indicate like parts throughout the several views:

Fig. 3 is an enlarged fragmentary rear elevation;

Fig. 4 is a view corresponding to Fig. 3 but showing a different position of some of the parts, some parts being broken away and some parts being shown in section;

Fig. 5 is a still further enlarged fragmentary section taken on the line 5—5 of Fig. 3;

Fig. 6 is a side elevation of the novel popping receptacle of my invention;

Fig. 7 is a fragmentary detail partly in elevation and partly in section, taken substantially on the line 7—7 of Fig. 3;

Fig. 8 is an enlarged fragmentary section taken substantially on the line 8—8 of Fig. 4;

Fig. 9 is an enlarged fragmentary section taken substantially on the line 9—9 of Fig. 4;

Fig. 11 is a schematic wiring diagram of my invention;

Fig. 12 is an enlarged fragmentary detail in side elevation of the popping receptacle of my invention and supporting mechanism therefor showing a modified arrangement;

Fig. 13 is a fragmentary detail corresponding to a portion of Fig. 3 but showing a modified form of control apparatus;

Fig. 14 is an enlarged fragmentary view partly in elevation and partly in section taken substantially on the line 14—14 of Fig. 13; and Fig. 15 is a fragmentary wiring diagram according to Fig. 11 but showing the additional switch of Figs. 13 and 14.

Figure 1:
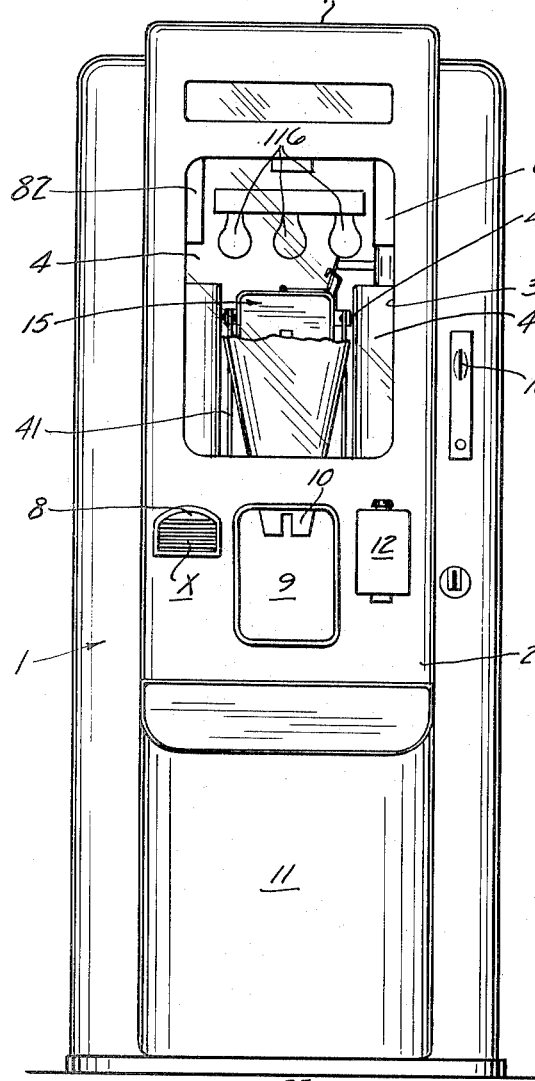
Fig. 1 is a front elevation of my improved corn popping machine, some parts being broken away.
Figure 2:
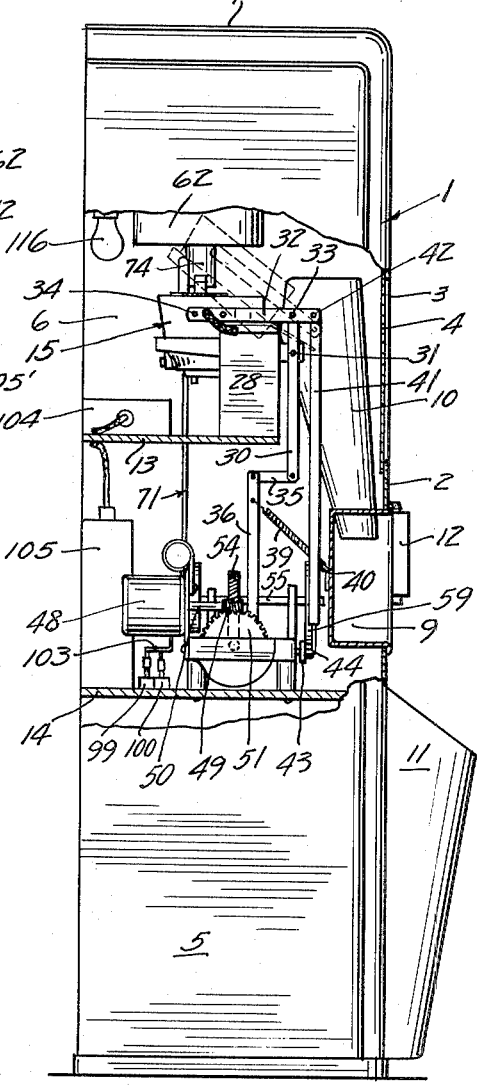
Fig. 2 is a view in side elevation as seen from the left to the right with respect to Fig. 1, some parts being broken away and some parts shown in section.
Figure 10:
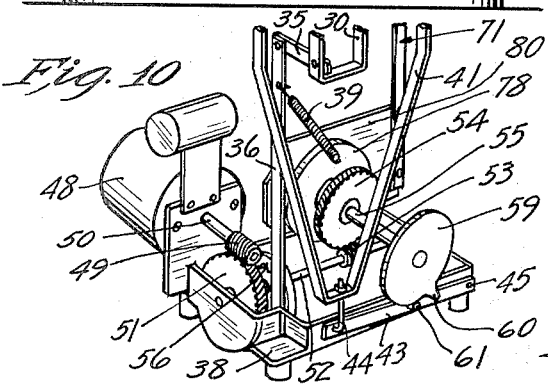
Fig. 10 is a fragmentary view in perspective of the motor and some of the driving connections of my invention.

In the preferred embodiment of the invention illustrated in Figs. 1 to 13, inclusive, a generally rectangular cabinet is indicated in its entirety by the numeral 1 and comprises a front wall portion 2, having therein a window opening 3 covered by a transparent pane of glass or the like 4, side walls 5 and 6, and a top 7. The front wall 2 is provided with a recess 8 for holding folded bags X, and a second recess 9 into which extends the lower end portion of a chute or spout 10 and which is adapted to contain one of the bags X in an open condition below the bottom of the spout 10. The numeral 11 indicates a waste container for the reception of spilled popcorn, salt, and used bags. A conventional salt dispenser is shown at 12 in overlying relationship to the waste container 11. Vertically spaced upper and lower supporting shelves 13 and 14, respectively, extend transversely of the casing 1 for a purpose which will hereinafter become apparent.

A corn popping receptacle 15 is made up of an upper hood-shaped member 16 and a lower pot-like container member 17, which cooperate to define a popping chamber 18. The upper member 16 is preferably made from sheet metal and is provided on opposite sides and adjacent one end thereof with a pair of axially aligned pins 19 which extend laterally outwardly in opposite directions, and are adapted to have pin and slot connections with cooperating slots 20 in opposite sides of the lower member 17, as indicated in Figs. 5 and 6. The upper member 16 is telescoped into the upper portion of the lower member 17 and is securely locked in place by a wing nut-equipped screw 21. The open front end of the receptacle 15 is normally closed by a closure member 22 hingedly secured to the front end portion of the lower member 17, as indicated at 23. The upper member 16 of the receptacle 15 is provided in its top with an opening 24, which is normally closed by a cover or the like 25 mounted for swinging movements with respect to the upper member 16 by a hinge connection 26, and which is biased toward a closed position by a torsion spring 27, see particularly Fig. 5. It will be noted that the lower member 17 is made of cast metal, such as aluminum or any suitable material, having relatively high heat conducting qualities.

The receptacle 15 is supported from the shelf 13 by supporting structure comprising a cross-sectionally U-shaped sheet metal base member 28 to opposite side portions of which are rigidly secured by welding or the like a pair of horizontally disposed arms or brackets 29. A yoke-like lever is pivotally secured at its opposite sides to the brackets 29 as indicated at 31. The extreme upper ends of the yoke 30 are pivotally secured, one each to one of a pair of rigid arms 32, as indicated at 33, which extend forwardly of the upper member 16 and to which it is rigidly mounted by screws or the like 34. The lower end portion of the yoke 30 has pivotal connection with one end of a rigid link 35 which at its other end is pivotally connected to the upper end of a lever arm 36 mounted for swinging movements to a bracket 37, rigidly secured to a base frame 38 supported by the lower shelf 14. A coil tension spring 39 exerts yielding bias on the lever arm 36 to move the same in one direction of swinging movement, which swinging movement may be transferred to the yoke 30 by the rigid link 35. By reference to Fig. 2, it will be seen that the spring 39 is anchored to a bracket 40 riveted or otherwise rigidly secured to the cabinet 1. A generally U-shaped yoke 41 has its upper ends pivoted one each to the extreme forward ends of one of the arms 32 as indicated at 42, and its lower intermediate portion connected to one end portion of a crank-acting lever 43 by a rigid link 44. The lever 43 is pivotally mounted at its opposite end to the base frame 38, as indicated at 45. From the above, it will be seen that the receptacle 15, under swinging movements of the lever 36, will partake of forward and rearward oscillatory movements and that downward swinging movement of the lever 43 will impart upward and forward tilting movement of the receptacle 15, as indicated by dotted lines in Figs. 2 and 5.

The closure 22 is normally held in a receptacle-closing position by a guide member 46 rigidly secured to the upper end of the base 28 by suitable means, such as rivets or the like 47. The guide 46 is made from resilient material, such as spring steel, bronze, or the like, and holds the closure 22 in a receptacle-closed position during oscillatory popping movements of the receptacle 15. However, when the receptacle 15 is moved to its dotted line popcorn discharging position of Figs. 2 and 5, the closure 22 is permitted by gravity to swing to an open position whereby to permit discharge of popped corn from the chamber 18 into the spout or chute 10 through which it descends into a bag X.

Oscillatory and tilting popped corn discharging movements will be imparted to the receptacle 15 by a motor 48 mounted on the base frame 38. A worm gear 49 is mounted fast on the shaft 50 of the motor 48 and has driving engagement with a worm wheel 51 keyed or otherwise rigidly secured to a transversely extended shaft 52 journalled in the base frame 38 at substantially right angles to the motor shaft 50. A worm 53 fast on the shaft 52 has meshing engagement with a worm wheel 54 mounted fast on a cam shaft 55 journalled in suitable bearings on the base frame 38 in laterally spaced parallel relationship to the motor shaft 50. Rigidly secured to the shaft 52 is an internal cam 56 having a plurality of lobes or the like 57 formed thereon. The lobes 57 engages a cam follower 58 secured to the lever arm 36, whereby to swing the lever 36 against bias of the spring 39 and, through the link 35 and the yoke-like lever 30, to impart oscillatory jiggling movements to the corn popping receptacle 15.

A cam 59 mounted fast on one end of the cam shaft 55 is formed to provide a cam lobe 60 which is adapted to engage a cam follower pin 61 mounted on the intermediate portion of the crank-acting lever 43 upon rotation of the cam shaft 55. Engagement of the pin 61 by the cam lobe 60 imparts downward swinging movement to the lever 43 and consequent downward movement of the yoke 41. This downward movement causes the popping receptacle 15 to be swing upwardly and forwardly about the axis of the pivotal connection 33 so that the closure 22 will be permitted to open under the action of gravity and the contents of the receptacle discharged into the chute 10.

Mechanism is provided for delivering quantities or charges of unpopped corn to the receptacle 15 from a storage box or hopper 62. The hopper 62 is provided with an opening 63 in its bottom wall, which opening is normally closed by a sliding cover or the like 64 biased toward its closed position by a coil tension spring 65. The spring 65 has one end anchored to a downwardly projecting ear 66 on the hopper 62 and a similar downwardly projecting ear or lug 67 on the cover 64. Also depending from the sliding cover 64 is an abutment 68 which is adapted to be engaged by one end of a push rod or the like 69 anchored to the upwardly projecting end 70 of a bell crank 71. The bell crank 71 is pivoted at its intermediate portion to the base frame 38 as indicated at 72. The opposite end of the push rod 69 is adapted, under swinging movements of the bell crank 71 in one direction, to engage an inclined cam-acting finger 73 integrally formed with the cover 25 of the receptacle 15 to open said cover against bias of the spring 27. A feeding cup 74 is mounted for pivotal movements about a horizontal axis to a bracket 74 rigidly secured to the upper end portion 70 of the bell crank 71, and is provided at its bottom with a weight 76 whereby to gravity bias the cup 74 toward an upright position as illustrated in Fig. 3. The cup 74, upon swinging movements of the bell crank 71 is movable from its upright loading position of Fig. 3 underlying the opening 63 of the hopper 62, to a tilted discharging position overlying the receptacle 5 as indicated in Fig. 4. A hooked-shaped tilting arm 77 is anchored to the upper member 16 of the receptacle 15 and projecting upwardly therefrom, lying in the path of travel of the bottom portion of the feeding cup 74. Movement of the bell crank 71 in a direction from the right to the left with respect to Figs. 3 and 4 and toward its position of Fig. 3 causes one end of the push rod 69 to engage the abutment 68 and move the cover plate 64 toward its open position. Simultaneously, the feeding cup 74 is moved to its upright loading position under the opening 63 of the hopper. Movement of the cover plate 64 to its open position permits kernels of unpopped corn A from slipping over the top edge of the cup 74 when the cup has been filled and before the cover plate 64 has reclosed the discharge opening 63. Swinging movement of the bell crank 71 in the opposite direction permits the spring 65 to close the opening 63 in the hopper 62. At the same time, the opposite end of the push rod 69 engages the finger 73 in the receptacle cover 25 to open the cover 25. During this latter swinging movement of the bell crank 71, the end portion of the cup 74 engages the tilting arm 77 and is tilted to its dumping position of Fig. 4 whereby to discharge the unpopped corn into the chamber 18 of the receptacle 15.

Means for causing swinging movements of the bell crank 71 about its pivot axis 72 includes a cam 78 on the cam shaft 55 and a cam follower pin 79 on the end portion 80 of the bell crank 71. It will here be noted that the end 80 of the bell crank 71 is provided with an arcuate slot 81 through which one end portion of the cam shaft 55 extends for a purpose which will hereinafter become apparent.

A supply tank 82 is adapted to contain a quantity of cooking oil or grease, such as coconut oil or the like, and is suitably secured within the cabinet 1. A supply line 83 including a length of flexible hose 84 communicates with the chamber 18 of the popping receptacle 15 and has interposed therein a conventional solenoid-operated valve or the like 85. The supply conduit 83 is connected to the outlet 86 of a pump 87, the inlet 88 of which communicates with the supply tank 82. Check valves 89 and 90 are disposed in the inlet 88 and outlet 86, respectively. The pump 87 comprises a plunger 91 biased in one direction of movement by a coil compression spring 92 and caused to move against bias of the spring 92 by a solenoid coil 93 encircling the body of the pump 87. The solenoid coil 93 is movable axially of the plunger 91 and is adapted to be securely held in a desired set position by set screws or the like 94. The plunger 91 is preferably of ferrous metal so as to be responsive to magnetic influence of the solenoid coil 93 when the same is energized. It will be noted by reference to Fig. 8 that the pump 87 communicates with the interior of the tank 82 by a conduit portion 95 to prevent loss of cooking oil which may seep past the plunger 91. The pump 87 is not essential to the efficient operation of the machine, but may be used when the design of the machine demands that the supply tank 82 be located below the level of the popping receptacle 15. The set position of the solenoid coil 93 determines the length of axial travel of the plunger 91 and consequently the amount of oil pumped into the chamber 18 of the popping receptacle with each pumping stroke of the plunger 91.

For the purpose of heating the popping receptacle 15 to correct popping temperature and prevent oxidization of residual oil or grease in the popping chamber 18, between popping cycles of my improved machine, I provide a heating element 96 and a pair of conventional thermostatic control elements 97 and 98. The heating element 96 is imbedded in the lower receptacle member 17 and is preferably of the type utilizing Nichrome or the like. The heating element is adapted to maintain a relatively high heat during the popping operation and a definite predetermined relatively lower heat during idle periods of the machine. The thermostatic element 97 is adjusted to control the relatively high popping temperature and is attached to the central bottom portion of the lower receptacle member 17, whereas the thermostatic element 98, which controls the relatively lower temperature, is secured to one side thereof. The temperature necessary to efficiently pop the corn is sufficiently high to cause breaking down or oxidizing of the cooking oil and undue vaporization thereof when the popping temperature is maintained for an extended period of time. I have found that by rapidly cooling the receptacle 15 to a point below the critical temperature of the oil or grease at the end of each popping operation, I have been able to prevent the formation of a varnish-like residue both on the interior and exterior of the popping receptacle 15 and associated parts of the machine. Heretofore, this residual coating has become a hindrance to the proper operation of the machine as well as causing an unsightly and unsanitary appearance to be imparted thereto. When using coconut oil as an aid to popping the corn, I have found that very satisfactory results are obtained by maintaining the popping basket at 340° to 350° Fahrenheit during the idle periods of the machine and causing the receptacle to be heated to approximately 410° Fahrenheit for the popping operation.

Among the several controls for my improved popping machine are a pair of switches 99 and 100 which are adapted to be operated by cam elements 101 and 102, respectively, the former of said cam elements including cam lobes 101a and 101b. Said cam elements are mounted on a single crank-acting arm 103 which is mounted fast on the end of the cam shaft 55 projecting through the slot 81 in the lower end 80 of the bell crank 71. Other controls include conventional operating relays, not shown, but contained within relay boxes 104 and 105 and conventional coin-operated switch mechanism, not shown, but which may be assumed to be contained within a suitable switch box or casing 106. By reference to the diagram in Fig. 11, it will be seen that a pair of power leads 107 and 108 extend from a source of current to the switch box 106 and that a master switch 109 is interposed in one of said leads. Other leads 110 supply current to the relays in the relay box 105 from the switch box 106 and power is supplied to the motor 48 by a pair of leads 111 extending thereto from suitable relays in the relay box 105. A pair of leads 112 supply current to the solenoid coil 93 and a single lead 113 supplies the current to one end of the heating element 96. A pair of leads 114 and 115 extend from the heating element to suitable relays, not shown, but contained in the relay box 104, the thermostatic control elements 97 and 98 being respectively interposed in these last-mentioned leads. The switches 99 and 100 are also shown as being interposed in suitable leads extending to the relay box 105. A plurality of incandescent lamps 116 are utilized to indicate that the machine is in an operative condition and are supplied with current from a suitable relay within the relay box 105 through leads 117.

When it is desired to render the machine operative, the power supply leads 107 and 108 are connected to a source of electrical energy and the master switch 109 is manually closed. Closing of the switch 109 causes a circuit to be closed through a portion of the heating element 96 through the leads 113 and 115 and thermostatic control 98. If there is no immediate cause for popping corn, the popping receptacle 15 will be heated to its lower temperature of between 340° to 350° Fahrenheit and maintained between these temperatures. When it is desired to obtain a supply of popped corn, the consumer sets the machine into operation by placing the required coin or coins into the coin slot 106' shown in Fig. 1. Insertion of the coin or coins in the slot causes the coin-operated mechanism to operate in the well-known manner to energize a relay in the relay box 104 to close a circuit through the leads 113 and 114, whereby the heating element operates to quickly heat the popping receptacle 15 to the popping temperature or approximately 410° Fahrenheit. When the popping temperature has been reached in the receptacle 15, a cycle of operations is initiated in the motor 48. Rotation of the motor shaft 50 causes the cam 56 to oscillate the popping receptacle 15. The cam shaft 55 and transverse shaft 52 are rotated by the motor shaft 50 through their respective worm and worm gear connections. Rotation of the cam 78 causes the bell crank 71 to deliver a filled cup 74 of unpopped corn to the receptacle 15, the door 25 thereof being opened by engagement of the said opposite end of the push rod 69 with the finger 73 of the cover 25. Simultaneously, the cam lobe 101a causes the switch 99 to energize the solenoid coil 93 and the solenoid operated valve 85 whereby a predetermined amount of cooking oil is injected to the chamber 18 through the conduit 83. From experience, it has been learned that when popped corn is popped by the French frying method herein disclosed, the amount of time required to satisfactorily pop a predetermined quantity or charge of popcorn does not vary from one popping operation to the next, provided that the amount of oil used with each popping operation is uniform. With the above in mind, it will be appreciated that the speed of the cam shaft 55 is calculated to effect an entire popping cycle for each revolution thereof. As the shaft 55 continues to rotate, the bell crank 71 swings to its cup-loading position of Fig. 3 and the cover 25 is permitted to close. The popping receptacle 15 continues to oscillate and agitate the kernels of popcorn within the chamber 18 so that they become entirely coated with the oil contained therein and uniformly heated from all sides. When the cam lobe 60 travels to a point where it engages the cam follower 61 on the crank-acting lever 43, the lever 43 and yoke 41 are moved downwardly to cause tilting movements of the popping receptacle to its dotted line position of Figs. 2 and 5, whereby to discharge the popped corn through the open end thereof into the chute 10, the closure 22 having been opened under action of gravity. During the popping operation, the consumer has removed a bag X from the recess 8, opened the same, and placed it below the lower end of the chute 10. Thus the popped corn descending through the chute 10 will be deposited in the open bag. It should here be understood that the oil has been largely absorbed by the popping corn and that merely a film of oil remains in the receptacle 15 at the end of the popping cycle.

As the cam lobe 60 passes over the cam follower 61 and therebeyond, the receptacle 15 is moved to its full line position of the drawings. At this time, the cam lobe 101b on the crank arm 103 trips the switch 99 to cause a predetermined quantity of relatively cool cooking oil to be discharged into the chamber 18. Immediately after discharge of the above-mentioned quantity of oil into the chamber 18, the cam lobe 102 on the crank arm 103 trips the switch 100 to shut off the motor 48 and causes the high temperature portion of the heating element 96 to be rendered inoperative. The relatively cool charge of oil causes the popping receptacle 15 to become rapidly cooled to the idle temperature of the machine, namely 340° to 350° Fahrenheit, where said temperature will be maintained until another cycle of operation is initiated. It will be noted that the quantity of oil sufficient to pop a given charge of corn efficiently is supplied by the double measured quantity introduced to the chamber 18 through the conduit 83, namely, that quantity which is introduced to cool the receptacle 15 and that which is introduced at the beginning of the popping operation.

When the consumer removes the filled bag of popcorn from the recess 9, the bag may be held under the salt dispenser 12 and the contents salted to taste. The waste container 11 serves to receive spilled salt, kernels of popcorn, torn or used bags, and the like.

The lamps 116 may, if desired, be arranged as indicators to warn the consumer as to the condition of the machine as well as to illuminate a portion of the apparatus so that the consumer may observe the operation thereof.

In the modified arrangement illustrated in Fig. 12, all parts identical to those of the structure in Figs. 1 to 11, inclusive, bear like characters. In this arrangement, a receptacle closure 22 is provided with an opening 119 through which extends the projected end of a conduit 120, which may be assumed to lead to the solenoid-operated valve 85. In this embodiment of my invention, the flexible conduit portion 84 is dispensed with, the conduit 120 being rigid in nature. It should be noted that the conduit 120 is metallic, whereby to absorb sufficient of the heat radiating from the popping receptacle 15 to maintain the cooking oil in a liquid state during its passage therethrough. This is accomplished in the case of the flexible conduit 84 by enclosing said conduit 84 in a woven metallic sheath or covering.

In the modified arrangement illustrated in Figs. 13 and 14, I provide an additional stop switch 121 and an actuator therefor. The switch 121 is located adjacent the switch 109 and in the path of travel of the actuator 122 which is rigidly secured to the crank-acting arm 103. The switch 121 is contained in the circuit for the motor 48 and is operated by the actuator 122 to stop the motor and to permit cooling of the receptacle to a substantially lower temperature before the popped corn is discharged. This arrangement differs from the preferred form of the invention in that, when a coin is deposited in the coin-receiving mechanism, the purchaser immediately receives a supply of popped corn from the receptacle and needs not wait for the machine to perform a full operational cycle.

With the switch 121 and actuator 122 included in the machine, the operation thereof is as follows: The purchaser places an opened bag X in the recess 9 and deposits the necessary coin in the slot 106′ provided in the machine. The motor 48 is energized to cause tilting popped corn discharging movements to be imparted to the receptacle 15 and popped corn therein to flow downwardly through the spout 10 into the opened bag X. The motor 48 will continue to operate to bring the receptacle back to its normal corn-receiving position, indicated by full lines in Figs. 5 and 12, after which the cam lobe 101a operates the switch 99 to cause a quantity of oil to be discharged into the popping chamber 18. When the cam element 102 engages the switch 100, the motor 48 will be stopped temporarily. The operation of the switch 100 to stop the motor 48 also closes a circuit through the leads 113 and 115 whereby the heating element 96 operates to bring the popping receptacle 15 to the popping temperature. When the popping temperature has been reached, the motor 48 is again energized through switch connections closed by the high temperature thermostat 97 and continues to operate until the actuator 122 again engages the switch 121. During this time, the receptacle 15 is charged with a supply of corn and oil and the corn is popped. Engagement of the switch 121 by the actuator 122 also shuts off current to the heating element 96 and permits the receptacle to cool to a substantially lower temperature than that required to pop the corn. In this instance, unless a second purchaser operates the machine to discharge the popped corn, the receptacle 15 will be allowed to cool to approximately 250° Fahrenheit and will be maintained at this temperature by the thermostatic element 98. This temperature is sufficiently high to avoid undue delay in reheating the receptacle to popping temperature, but is not sufficient to scorch the popped corn contained therein. If desired, suitable cooking means, not shown, may be utilized to cool the receptacle 15 to the above mentioned lower temperature.

My invention has been thoroughly tested and found to be completely satisfactory for the objects set forth; and while in the above specification I have described one embodiment and a single modified form which my invention may assume in practice, it will, of course, be understood that the same is capable of modification and that modification may be made without departing from the spirit and scope of the invention as expressed in the following claims.

What I claim is:

1. In a corn popping machine of the class described, a receptacle for the reception of liquids and unpopped corn, means mounting said receptacle for oscillatory and popped corn discharging tilting movements, means for delivering a predetermined quantity of liquid and unpopped corn to the receptacle, mechanism for imparting oscillatory movements to the receptacle during the popping operation, means for maintaining said receptacle at a predetermined temperature during the popping operation, the last said means including a heating element associated with said receptacle and a thermostatic control element therefor, and means for maintaining a definite predetermined substantially cooler temperature in said receptacle during idle periods of the popping mechanism.

2. In a corn popping machine of the class described, a receptacle for the reception of liquids and unpopped corn, means mounting said receptacle for oscillatory and popped corn discharging tilting movements, means for delivering a predetermined quantity of liquid and unpopped corn to the receptacle, mechanism for imparting oscillatory movements to the receptacle during the popping operation, means for maintaining said receptacle at a predetermined temperature during the popping operation, the last said means including a heating element associated with said receptacle and a thermostatic control element therefor, and means for maintaining a definite predetermined substantially cooler temperature in said receptacle during idle periods of the popping mechanism, said last-mentioned means including a second thermostatic control element associated with said receptacle and said heating element.

3. In a corn popping machine of the class described, a receptacle for the reception of liquids and unpopped corn, means mounting said receptacle for oscillatory and popped corn discharging tilting movements, means for delivering a predetermined quantity of liquid and unpopped corn to the receptacle, mechanism for imparting oscillatory movements to the receptacle for a definite time interval during the popping operation, said mechanism comprising a motor driven cam and a lever operated thereby, means for maintaining said receptacle at a predetermined temperature during the popping operation, the last said means including a heating element associated with said receptacle and a thermostatic control element therefor, and means for maintaining a definite predetermined substantially cooler temperature in said receptacle during the idle periods of the popping mechanism, said last-mentioned means including a second thermostatic control element associated with the receptacle and with said heating element.

4. The structure defined in claim 2 in further combination with mechanism for tilting said receptacle to discharge the popped corn therefrom, said mechanism including a second motor driven cam and linkage associated therewith and said receptacle.

5. In a corn popping machine of the class described, a receptacle for the reception of liquids and unpopped corn, means mounting said receptacle for oscillatory movements, power operated mechanism for delivering a predetermined quantity of unpopped corn to said receptacle, means for maintaining said receptacle at a definite predetermined temperature below the temperature required to pop the corn during idle periods of the machine, the last said means including a heating element and a thermostatic control element therefor, means including said heating element and a second thermostatic control element for raising the temperature of said receptacle to a predetermined corn popping level, mechanism responsive to said raising of temperature for imparting oscillatory movements to said receptacle, means for discharging the corn from said receptacle upon completion of a predetermined number of oscillations thereof, and means for rapidly cooling said receptacle when the corn has been discharged therefrom, said last-mentioned means including mechanism for introducing a measured quantity of relatively cool liquid into said receptacle.

6. In a corn popping machine of the class described, a receptacle comprising a pair of cooperating upper and lower members defining a popping chamber having a discharge opening and adapted to receive liquids and unpopped corn, a closure for said discharge opening, means for delivering a predetermined quantity of liquid and unpopped corn to said chamber, means mounting said receptacle for oscillatory and popped corn discharging tilting movements, mechanism for imparting oscillatory movements to the receptacle during the popping operation, means for maintaining said receptacle at a predetermined temperature during the popping operation, the last said means including a heating element associated with one of said receptacle members and thermostatic control element therefor, and means for maintaining a definite predetermined substantially cooler temperature in said receptacle during idle periods of the popping mechanism, said last-mentioned means including a second thermostatic control element associated with said one of said members and said heating element.

7. In a corn popping machine of the class described, a receptacle comprising a pair of cooperating upper and lower members defining a popping chamber having a discharge opening and adapted to receive liquids and unpopped corn, a closure for said opening, the said lower member having a relatively high heat conductivity, means for delivering a predetermined quantity of liquid and unpopped corn to said chamber, means mounting said receptacle for oscillatory and popped corn discharged tilting movements, mechanism for imparting oscillatory movements to a receptacle during the popping operation, means for maintaining said receptacle at a predetermined temperature during the popping operation, the last said means including a heating element associated with said lower member and a thermostatic control element therefor, and means for maintaining a definite predetermined substantially cooler temperature in said receptacle during idle periods of the popping mechanism, said last-mentioned means including a second thermostatic control element associated with said lower member and said heating element.

8. The structure defined in claim 6 in which said heating element is embedded in said lower receptacle member.

9. The structure defined in claim 6 in further combination with mechanism for tilting said receptacle to discharge the popped corn therefrom, said mechanism including a motor driven cam and linkage associated therewith and said receptacle.

10. The structure defined in claim 6 in further combination with means for releasably locking said members in chamber-forming relationship, said means including releasable connections and a single locking element therefor.

11. In a corn popping machine of the class described, a receptacle comprising a pair of cooperating upper and lower members defining a popping chamber having a discharge opening, said lower member having a relatively high heat conductivity, a heating element embedded in said lower member, means for releasably locking said members in chamber-forming relationship, said means comprising cooperating pin and slot connections adjacent one end of said receptacle and a single locking screw at the other end thereof for maintaining said connections in locked relationship, a closure for said opening, means for delivering a predetermined quantity of liquid and unpopped corn to said chamber, means mounting said receptacle for oscillatory and popped corn discharging tilting movements, mechanism for imparting oscillatory movements to the receptacle for a definite time interval during the popping operation, said mechanism comprising a motor driven cam and a lever operated thereby, means for maintaining said chamber at a predetermined temperature during the popping operation, the last means including said heating element and a thermostatic control element therefor, and means for maintaining a definite predetermined substantially cooler temperature in said receptacle during the idle periods of the popping mechanism, said last-mentioned means including a second thermostatic control element associated with the receptacle and with said heating element.

References Cited in the file of this patent

UNITED STATES PATENTS

| 304,111 | Laube | Aug. 26, 1884 |
| 1,104,990 | Harding | July 28, 1914 |
| 2,134,088 | Obdyke | Oct. 25, 1938 |
| 2,216,805 | Case | Oct. 8, 1940 |
| 2,504,728 | Purpura | Apr. 18, 1950 |
| 2,518,247 | Nairn | Aug. 8, 1950 |
| 2,537,744 | Cretors | Jan. 9, 1951 |
| 2,549,449 | Gibson | Apr. 17, 1951 |
| 2,610,283 | Kolisch | Sept. 9, 1952 |
| 2,611,070 | Chandler | Sept. 16, 1952 |

OTHER REFERENCES

Farmers Bulletin, No. 1679, revised March 1948, U. S. Dept. of Agriculture, pages 13–14.

Chenowith, How to Make Candy, 1936, Macmillan, N. Y., page 150.